United States Patent
Schärzler

[11] 3,799,474
[45] Mar. 26, 1974

[54] BI-DIRECTIONAL DEFLECTIBLE CONTROL FLAP FOR AIRFOILS

[75] Inventor: Hans-Jürgen Schärzler, Munich, Germany

[73] Assignee: Vereinigte Flugtechnische Werke-Fokker Gesellschaft mit beschrankter Haftung, Bremen, Germany

[22] Filed: May 24, 1972

[21] Appl. No.: 256,382

[30] Foreign Application Priority Data
May 26, 1971 Germany.................... 2125971

[52] U.S. Cl. ............................. 244/42 DA
[51] Int. Cl. ............................... B64c 3/50
[58] Field of Search ......... 244/40, 41, 42 CB, 42 D, 244/42 DA, 42 DB, 43, 90

[56] References Cited
UNITED STATES PATENTS
2,222,435  11/1940  Ksoll.............................. 244/42 DB
2,583,405  1/1952  Youngman..................... 244/42 DB
2,137,879  11/1938  Ksoll.............................. 244/42 DB Primary Examiner—Duane A. Reger
Assistant Examiner—Charles E. Frankfort
Attorney, Agent, or Firm—Smyth, Roston & Pavitt

[57] ABSTRACT

Control flap for aircraft mounted to the trailing end of an airfoil profile, wing or stabilizer and forming a profile-continuing part thereof in neutral position, and having a first flap and a second flap disposed one behind the other in direction of air flow. The second flap is hinged to the first flap and the first flap is hinged on the profile, so that only the second flap is deflected for deflection of the control flap in one direction, while for deflection in the opposite direction both flaps turn in unison. In each case different aerodynamically contoured gaps open for passage of air in opposite directions.

9 Claims, 12 Drawing Figures 3,799,474

BI-DIRECTIONAL DEFLECTIBLE CONTROL FLAP FOR AIRFOILS

BACKGROUND OF THE INVENTION

The present invention relates to an arrangement of hinged control flaps for airplanes such as ailerons, flaps, etc., which upon turning in either direction, establish an aerodynamically effective passage or gap for air.

Control flaps which are turned in either direction are usually provided with such aerodynamically effective gap so that the airflow does not separate from the adjacent airfoil surface in case of a large deflection. Large deflections of control surfaces occur particularly in planes with fold-up wings. When the wings have been folded up, yaw is to be controlled aerodymanically at sufficient yaw-acceleration.

A known type of control flaps is constructed with covers, which cover the flap when in neutral position and on both sides. These additional covers are kinematically connected with the wing profile of the craft as well as the flap so that upon turning of the latter, air flows from the pressure side to the suction side through the gap. An arrangement of this type, however, does not permit that the air duct and exit gap to have an aerodynamical configuration. Also, the operating linkage for the covers is quite complicated. Moreover, the arrangement has dimensions which are not fully usable for control deflection of the flap.

Lift producing air foil elements are known having plural parts arranged along the trailing edge of a wing, and retractible and protractible in relation thereto for normal flight and landing. However, the invention does not relate to this kind of elements.

DESCRIPTION OF THE INTENTION

It is an object of the present invention to provide bi-directional deflectible control flaps that permit large deflections in both directions, whereby in either case a passage for air is established, permitting traversal by air from the high to the low pressure side in each case. Moreover, the construction is to be simple, making best use of available space and does not require enlargement of the wings.

In accordance with the preferred embodiment of the invention, it is suggested to provide the control flap as at least a two-flap arrangement, one behind the other and continuing the aerodynamic profile of an airfoil at the trailing edge thereof. The two flaps are hinged or pivotally interconnected for turning relative to each other in one direction, but they turn in unison relative to the wing in the opposite direction. The pivotal linking is provided so that for each of these two turning deflections a different but converging gap is established having aerodynamic profile commensurate with the direction of airflow through the gap in each case.

The control flap area that is effective in each case is different for the two directions of deflection. This is an advantage, as a particular control flap on wings, or elevators, provides different control effects for what is called positive and negative deflections. Thus, a particular flap operates inherently asymmetrically. Particular, for yaw control upon gliding of a plane with foldable wings and in vertical wing position this asymmetry has to be compensated. The compensation is automatically carried out by the control flap structure of the invention, wherein different flaps are effective in different directions.

In accordance with another feature of the invention, each flap is provided with means to establish one pivot point outside of its profile surface. Two pivot points of the flaps on the same side are interconnected to form a common hinge axis for turning the two flaps relative to each other. The pivot points on the other sides connect to the airfoil, for pivoting relative thereto but in unison, and they do so connect to the same or to different airfoil sides. In the former case, the hinge actuator for pivoting the flaps relative to each other is interposed in the connection between the pivot point of the rearmost flap and the airfoil; in the latter case a linkage rod runs between opposite airfoil sides from the rearmost flap to the airfoil for contributing two pivot points to a four pivot point hinge arrangement. Also, in the latter case, a single drive mechanism for the flaps is provided with two dead-center positions, making it possible to deflect the control flap by means of but one actuator. Still further in this case, the several pivot points on each side should be placed in close proximity to minimize relative displacement of the flaps.

The pivot points are established in the ends of support arms extending from the flaps and airfoil, to obtain favorable lever conditions. The resulting gaps should have nozzle configuration in the direction of traversal by air in either case.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a somewhat schematic illustration of the flap arrangement in the trailing edge of an airfoil and in neutral position;

FIG. 2 is the arrangement of FIG. 1 but with negative flap deflection;

FIG. 3 is the arrangement of FIG. 1 but with positive flap deflection;

FIGS. 4, 5 and 6 respectively supplement FIGS. 1, 2 and 3 with the hinge mechanism and actuators;

FIGS. 7, 8 and 9 show the preferred embodiment of the invention and correspond to FIGS. 1 through 3 but with a four pivot point hinge arrangement;

FIGS. 10, 11 and 12 respectively supplement FIGS. 7, 8 and 9 with a simple actuator.

DESCRIPTION OF THE DRAWINGS

Proceeding now to the detailed description of the drawings.

It can, thus, be seen that for each direction of control flap deflection, one particular gap is formed, each having a converging, nozzle-like entrance respectively established adjacent the trailing end of the profile of airfoil 1 or of flap 2. Thus, the gaps are individually proportioned for each case, to have optimum contour for airflow as far as aerodynamic conditions are concerned. The arrangement is particularly designed for folding wings. Other type airfoils may be provided so that the flaps turn in unison in positive direction, i.e., in the direction of the high pressure side of the wing.

Figure 4:
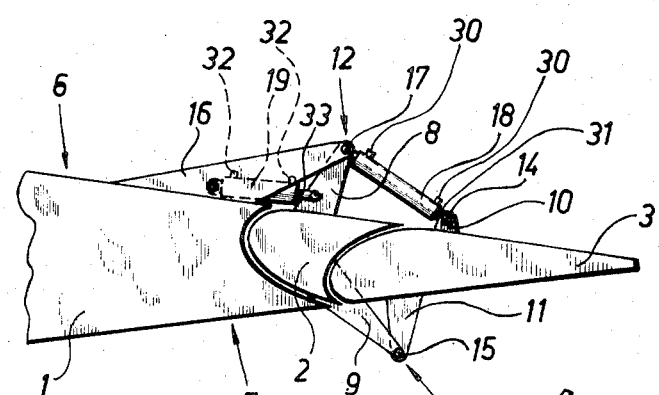
Figure 5:
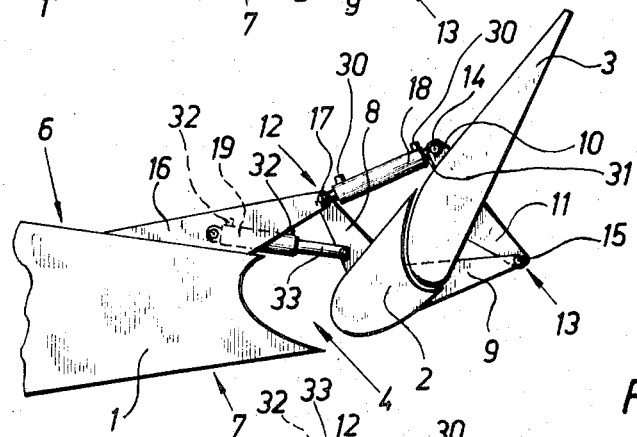
Figure 6:
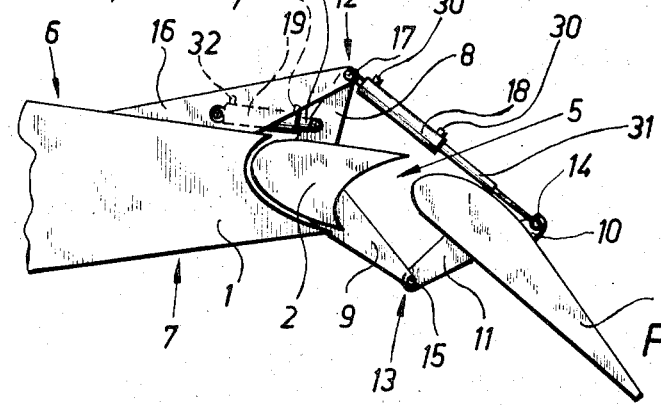

After having described the dynamic conditions, I turn to FIGS. 4 through 6 showing construction details particularly as far as the hinge structure for mounting and turning the flaps is concerned. The flap 2 is provided with arms 8 and 9 respectively at upper and lower sides, flap 3 is provided similarly with arms 10 and 11. These arms are respectively secured to the flaps. The arms 8 through 11 respectively establish pivot points 12 through 15 at their ends. Additionally, a support arm 16 is provided on side 6 of airfoil 1, having pivot point 17.

Pivot points 13 and 15 of arms 9 and 11 are interconnected, i.e., arm 11 can pivot on arm 9 and vice versa, establishing a hinged connection between flaps 2 and 3. Arm 8 has its pivot point 12 connected (pivotally linked) directly to pivot 17 of arm 16 so that flap 2 is hinged to profile 1. The same hinge point connects to one end of the cylinder of a piston-cylinder arrangement 18, having piston whose piston rod 31 connects to pivot point 14 on arm 10. Reference numeral 30 refers to the hydraulic line connections to the cylinder. Another piston cylinder arrangement 19 links arm 16 with arm 8, whereby the cylinder thereof, having hydraulic connectors 32, connects to arm 16, and the piston rod 33 of the piston cylinder arrangement 19 connects to arm 8. As can be seen from the drawing, the cylinder-piston-arrangement 19 is disposed close to the base of arms 16 and 8 respectively. The elements 18 and 19 constitute hydraulic motors as actuators for control flap deflection.

The control flap is controlled for deflection either by operation of cylinder-piston-motor 18 or by motor 19. For negative control flap deflection, cylinder 19 is used only (FIG. 5) in that piston rod 33 protracts thereby pivoting flaps 2 and 3 together. Pivots 12 – 17 define the hinge axis for this turning motion of the two flaps. As rod 33 protracts gap 4 opens up and air flows from the pressure side to the suction side of the profile. Motor 18 maintains flaps 2 and 3 in relation to each other, corresponding to neutral position.

Figure 1:
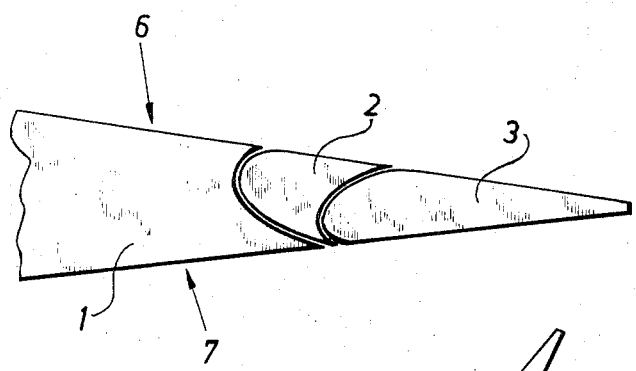
FIG. 1 illustrates an airfoil profile 1, such as a wing or stabilizer with two flaps 2 and 3, which supplement each other for establishing a control flap that continues, in neutral position, the aerodynamic profile. The rear flap 3 can be regarded as a control flap per se, the portion 2 can be regarded as an extension. The two flaps 2 and 3 are arranged so that, for example, upon turning by a negative angle, both flaps turn in unison, i.e., they do not turn relative to each other.
Figure 2:
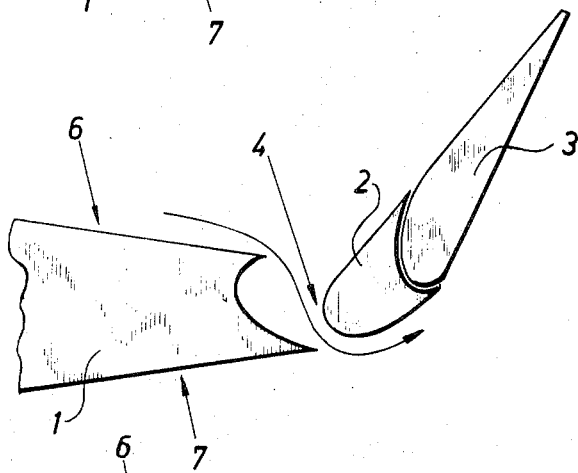
As shown in FIG. 2, a gap 4 is formed in that case between airfoil 1 and flap 2. The arrow indicates the flow pattern through the gap, air flowing from side 6 to side 7 towards the rear of the airfoil. As can be seen from the drawing, airfoil 1 and flap 2 interface in a curved configuration so that gap 4 provides a converging path for flow from the high pressure side of the arrangement to the low pressure side thereof if flap 3 is tilted together with flap 2 as shown in FIG. 2 namely in the up direction.
Figure 3:
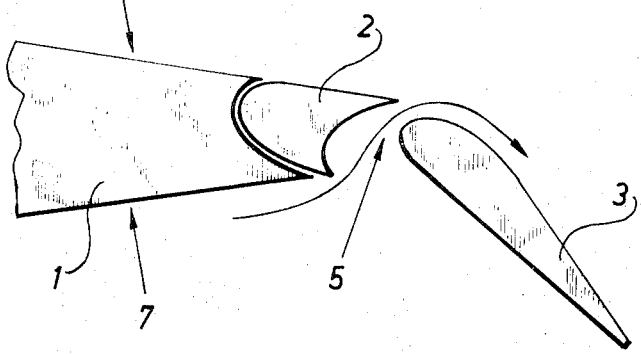
FIG. 3 shows the flaps turned in positive direction. In this case, only flap 3 turns and flap 2 remains in neutral position. As a consequence, a gap 5 forms between flaps 2 and 3, and air flows from side 7 to side 6 as indicated by the arrow, which is in the reverse direction from the one shown in FIG. 2. Particularly, it can be seen also here that flaps 2 and 3 interface in a curved condiguration so that upon turning of flap 3 in the down direction the gap 5 converges as to flow from the high pressure under side to the low pressure upper side and towards the rear of the airfoil as indicated by the arrow.

For a positive deflection of the control flap, motor 18 is used and protracts rod 31 (FIG. 6). Motor 19 has its rod 33 in retracted position. Therefor, flap 2 remains in normal or neutral position, but flap 3 turns on pivot points 13 – 15 as the hinge axis for this deflection. Accordingly, gap 5 opens up and permits through flow of air (FIG. 3) as appropriate under the circumstances.

Of course, motor actuator 19, when retracting, returns flaps 2 and 3 to the neutral position, and motor 18, when retracting, returns flap 3 to neutral position. In this example the motors do not control the respective reversely directed control flap deflection, because motor 19 acts directly on the hinge mechanism (8-16-12-17) for negative deflection, while motor 18 even uses the latter hinge structure as reference for operating hinge structure 9-11-13-15.

The hinge and actuator mechanism shown in FIGS. 7 through 12 is somewhat modified for otherwise similar flap structure. The side 7 of airfoil 1 is also provided here with a support arm 20 having pivot point 21 on its free end. Arms 9 and 11 are hinged together at pivot point 13–15 as before. Also, arm 8 has pivot point 12 and is hinged to arm 16. However, pivot point 14 of arm 10' on flap 3 is pivoted to one end of a rod or lever 22, having its other end pivoted to arm 20 at 21. In other words, flap 3 is hingedly connected to airfoil 1 on the opposite side.

It is desirable to have a dead-center position for each turning direction of the control flap. Also, flaps 2 and 3 should not move relative to each other when turned in unison. Therefor, pivot points 12 – 17 are rather close to pivot 14, and points 13 – 15 are rather close to pivot 21, respectively for neutral flap position.

Upon turning the control flap into the negative direction (FIG. 8), flaps 2 and 3 are turned together about a hinge axis approximating the pivot points 12 – 14 and 17, serving as dead-center; gap 4 opens up as before. Upon turning the control flap into the positive direction (FIG. 9), flap 3 alone turns on a common hinge axis defined by the close proximity of pivots 13 – 15 and 21, serving as dead-center point. Gap 5 between flaps 2 and 3 opens up as before.

It can be seen that hinge points 12 – 17; 13 – 15; 14 and 21 establish a four pivot linkage whereby, of course, the first two establish the hinge axles proper, but it can be seen that kinematically a pivot or turning axis is defined between 21 and 13 – 15 and another one between 12 – 17 and 14.

Figure 7:
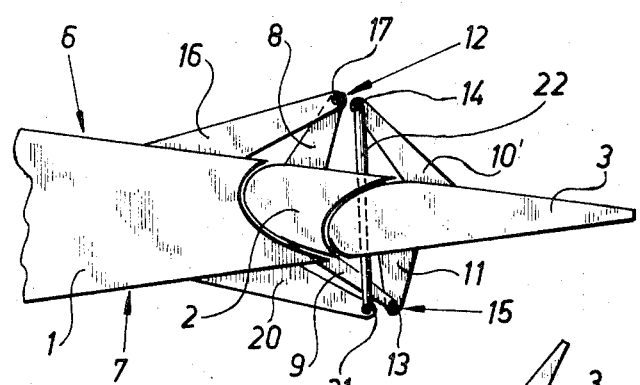
Figure 8:
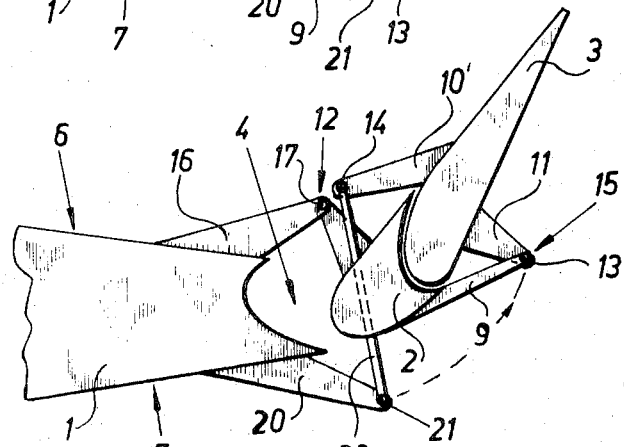
Figure 9:
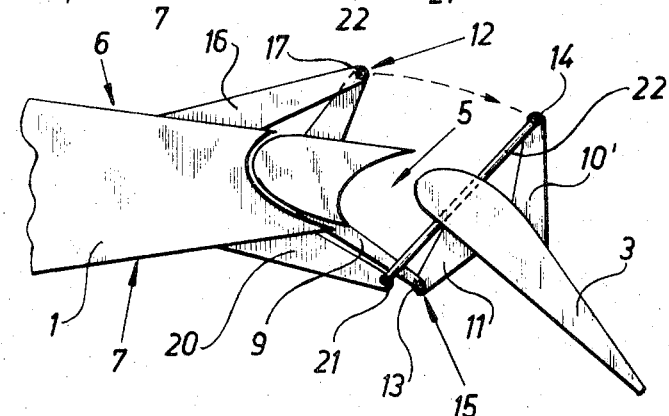

This particular arrangement of FIGS. 7, 8 and 9 is particularly suitable for small deflections of the control flap, because for small deflecting angles the actual turning point of a flap relative to the airfoil 1 remains within the profile as continued by the flaps in neutral position. That turning point is the intersection of lines 14 – 21 and 12 – 13.

Figure 10:
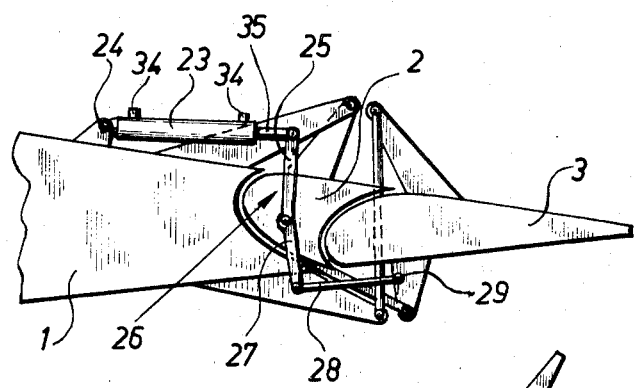
Figure 11:
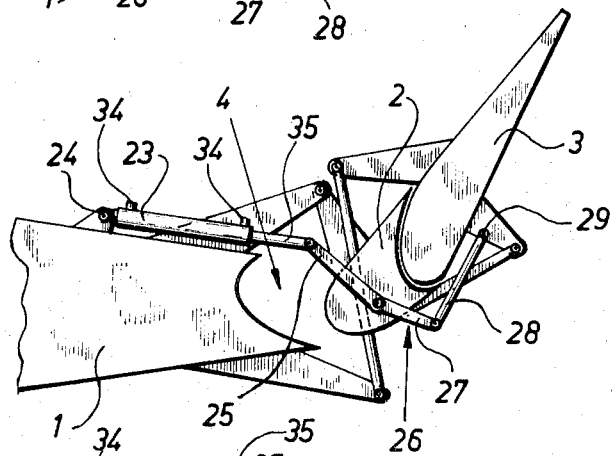
Figure 12:
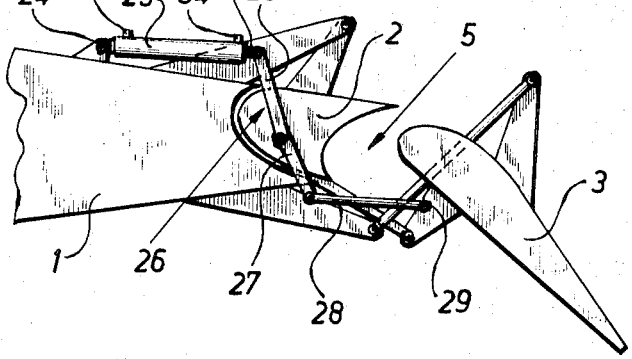

The hydraulic motor and actuators for the arrangement shown in FIGS. 7, 8 and 9 have been added in FIGS. 10 through 12. A hydraulic motor 12 (piston-cylinder-arrangement) is disposed in about the center of the control flap (as to dimension taken transversely to the plane of the drawing). There are provided appropriate slots, including slots for receiving rod 22 unless provisions are made to have these elements connected to the side of the flap structure. The cylinder of motor 23 is pivotally linked to upper side 6 of airfoil 1 at pivot point 24. The motor has a piston rod 35 pivotally linked to one arm 25 of a double arm lever 26. Lever 26 has its pivot point on flap 2. The short lever arm 27 has its end point pivoted on a rod 28 which, in turn, is linked to arm 11, but at a point 29 which is at approximately the midpoint of arm 11.

Motor 23 operates the control flap in either direction. In the neutral position (FIG. 10), the rod 35 is partially protracted. For pivoting the control flap for negative deflection (FIG. 11), piston rod 35 is pushed out whereby flaps 2 and 3 pivot in unison as described. As piston rod 35 is pulled all the way in, double arm lever 26 swivels and rod 28 pushes flap 3 out for positive deflection. Gaps 4 and 5 respective result as described.

The invention is not limited to the embodiments described above but all changes and modifications thereof not constituting departures from the spirit and scope of the invention are intended to be included.

I claim:

1. Control flap for aircraft mounted to the trailing end of an airfoil profile, wing or stabilizer and forming a profile-continuing part thereof in neutral position, comprising:

a first flap and a second flap disposed one behind the other in direction of air flow;

first means for hinging the second flap to the first flap;

second means for hinging the first flap on the airfoil;

third means linking the first and second flaps for turning the second flap relative to the first flap in one direction only from neutral position towards one side of the airfoil and back into the neutral position but not beyond;

fourth means linking the first flap and the airfoil for turning the first and second flaps together relative to the airfoil in the opposite direction only from neutral position and towards the other side of the profile, and back into the neutral position but not beyond;

the first and second means constructed so that a first converging gap opens between the first and second flaps upon pivoting by operation of the third means but remains closed upon turning operation by the fourth means, and a second converging gap opens between the first flap and the airfoil upon pivoting by operation of the fourth means but remains closed upon turning operation by the third means, respectively for passage of air;

the first flap and the airfoil interfacing in a curved configuration so that upon turning of the first and second flaps together the second gap converges as to flow from that other side of the profile into which said first and second flaps have been turned, towards the rear of the airfoil and to the one side of the profile; and the first flap and the second flap interfacing in a curved configuration so that upon turning of the second flap relative to the first flap the first gap converges as to flow from that one side of the airfoil, corresponding to said one direction into which said second flap has been turned, towards the rear of the airfoil and to other side of the airfoil with respect thereto.

2. Control flap as in claim 1, wherein said gaps respectively formed by operation of the third and fourth means, each have nozzle shaped configuration.

3. Control flap as in claim 1, the first means including a pair of arms respectively extending from the first and second flaps on one side thereof, and being hinged at their respective ends, the second means including a pair of arms respectively extending from the profile and the first flap and being hinged at their respective ends, the second means further including linking means for hinging the second flap to the profile so that the second flap does not pivot relative to the first flap, when the first flap pivots relative to the profile.

4. Control flap as in claim 3, the linking means including the third means, which, when operating causes the arms of the pair to pivot thereby turning the first flap on the second flap.

5. Control flap as in claim 3, there being a first arm on one side of the profile and a second arm on the second flap at the other side of the profile, the linking means extending from the second arm on the second flap to the first arm on the profile.

6. Control flap as in claim 3, wherein the third and fourth means includes a common actuator linked to the first and second flaps for pivoting the second flap on the pivot point of the first means when operating in one direction, and pivoting the first and second flaps on the pivot point of the second means when operating in the opposite direction.

7. Control flap as in claim 1, wherein the first and second means include plural arms extending from the profile and from the first and second flaps, for establishing hinge points outside of the axis through the profile and the flaps when in neutral position.

8. Control flap as in claim 6, the plural arms having disposition that a first pair of closely spaced pivot points is defined on one side of the flaps for the netural position, and a second pair of closely spaced pivot points is defined on the other side of the flaps for the neutral position, respectively separated by operation of the third and fourth means for control flap action in the one or the opposite direction.

9. Control flap as in claim 7, wherein a first pair of arms of the plurality defines a first pivot point for the profile and the first flap, a second pair of arms of the plurality defines a second pivot point for the first and second flaps, and means for linking the second flap to the first pivot point.

\* \* \* \* \*